United States Patent
Lunsford et al.

(10) Patent No.: US 7,681,386 B1
(45) Date of Patent: Mar. 23, 2010

(54) COTTON WEED REEL APPARATUS AND METHOD

(76) Inventors: Kenny Dean Lunsford, RR 2, Box 123, Guymon, OK (US) 73942; Kimberly Ann Falls, 1450 Rim Rock, Guymon, OK (US) 73942

( * ) Notice: Subject to any disclaimer, the term of this patent is extended or adjusted under 35 U.S.C. 154(b) by 4 days.

(21) Appl. No.: 12/220,566

(22) Filed: Jul. 25, 2008

Related U.S. Application Data

(63) Continuation-in-part of application No. 12/002,998, filed on Dec. 19, 2007, now abandoned.

(60) Provisional application No. 60/875,958, filed on Dec. 20, 2006.

(51) Int. Cl.
*A01D 46/16* (2006.01)
(52) U.S. Cl. .................................................. 56/44
(58) Field of Classification Search ............... 56/28, 56/33, 34, 30, 126–130, 330, 36–50
See application file for complete search history.

(56) References Cited

U.S. PATENT DOCUMENTS

| | | | | |
|---|---|---|---|---|
| 3,927,511 A | * | 12/1975 | Burris et al. | 56/33 |
| 4,199,927 A | | 4/1980 | Craig et al. | 56/314 |
| 4,313,296 A | * | 2/1982 | Mitchell, Jr. | 56/34 |
| 6,134,867 A | * | 10/2000 | Goering et al. | 56/34 |
| 6,381,937 B1 | | 5/2002 | Nelson | 56/33 |
| 7,032,369 B1 | | 4/2006 | Eaton et al. | 56/233 |
| 7,146,789 B2 | | 12/2006 | Orsborn et al. | 56/28 |

* cited by examiner

*Primary Examiner*—Robert E Pezzuto
(74) *Attorney, Agent, or Firm*—Martin G. Ozinga; Phillips Murrah PC

(57) ABSTRACT

The invention provides a mechanical apparatus to assist cotton harvesters in suppressing in-row weed growth and/or feeding cotton into the row unit of the cotton harvester using a rotating weed reel. The weed reel comprises a frame assembly, a rotatable shaft coupled to the frame assembly, and protruding rods extending outwardly from the shaft so as to contact the ground between the in-row cotton plants and deflect weeds and debris out of a desired area.

4 Claims, 6 Drawing Sheets

COTTON WEED REEL APPARATUS AND METHOD

CROSS-REFERENCE TO RELATED APPLICATIONS

The present application is a continuation-in-part of U.S. Ser. No. 12/002,998, filed Dec. 19, 2007 now abandoned, which claims priority to U.S. Provisional Ser. No. 60/875,958, filed Dec. 20, 2006. Each of the applications listed above is hereby expressly incorporated herein by reference in their entirety.

BACKGROUND OF THE INVENTION

1. Field of the Invention

In general, the present invention relates to an apparatus and method for removing weeds from crop fields. More particularly, the invention provides a mechanical means to assist cotton harvesters in feeding cotton into the row unit of a cotton harvester and/or pitch out weeds and debris in the way of the row unit.

2. Description of the Prior Art

Demand for cotton is ever increasing. As this demand grows, it is also more desirable to provide environmentally friendly cotton production as well as more efficient means for producing cotton. Furthermore, there is an ever increasing demand for "organic" cotton. Cotton sold as "organic" must be grown according to the federal guidelines for organic crop production. Soil fertility practices that meet organic certification standards typically include crop rotation, cover cropping, animal manure additions, and use of naturally occurring rock powders while eliminating or reducing chemical use in general.

Weed management has always been challenging in the production of cotton due to the nature of cotton farming. Traditional weed management with chemicals is, therefore, becoming more in disfavor as the public desire to reduce chemical use grows. In specific to organic farming, farmers are relying on combinations of cover crops, flame weeding, and other known cultural practices. Needless to say, these prior art methods have numerous disadvantages and risks.

As the demand increases for cotton and more environmentally friendly methods of production, today's farmers are looking for new means to simultaneously reduce tillage passes and suppress in-row weeds. The prior art devices and methods have failed to bridge the gap between industry needs and the currently available alternatives. Therefore, an extensive opportunity for advancements and innovation remains where the prior art fails or is deficient.

SUMMARY OF THE INVENTION

In view of the foregoing disadvantages inherent in the known types of cotton farming equipment now present in the prior art, the present invention provides a new and improved apparatus and method wherein the same can be utilized in those situations where safety, cost, and ease of implementation are desired. As such, the general purpose of the present invention, which will be described subsequently in greater detail, is to provide a new and improved cotton reel for use with cotton harvesters which has many of the advantages of the prior art mentioned heretofore and many novel features that result in a new and improved cotton reel which is not anticipated, rendered obvious, suggested, or even implied by any of the prior art devices or methods, either alone or in any combination thereof.

To attain this, the present invention essentially comprises a frame assembly coupled to a rotating shaft or reel having protruding rods extending therefrom which may be utilized in conjunction with a cotton harvester. The term cotton harvester is used generally herein to describe all types of equipment used to harvest cotton and the like, such as cotton pickers and cotton strippers. As such, the use of said term shall not be regarded as limiting. The reel may be turned forward or reverse, or rotated clockwise or counterclockwise, such that the flexible rods may assist the cotton harvester in feeding cotton into the row unit or pitch out weeds and debris in the way of the row unit. Further, it may be raised or lowered from the cab as desired by an operator to selectively engage the ground with the rotating rods.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved cotton reel apparatus and method of use for assisting in the removal of weeds and debris in cotton fields and which may also be utilized to assist a cotton stripper in feeding cotton into the row unit.

It is a further object of the present invention to provide a new and improved cotton reel apparatus and method of utilizing same which is of a durable and reliable implementation.

An even further object of the present invention is to provide a new and improved cotton reel apparatus and method of using the same which is susceptible to a low cost of operation. Accordingly, is then susceptible to low prices of use to the farming industry, thereby making such economically available to the consuming industry.

Still another object of the present invention is to provide a new and improved cotton reel apparatus and method of using the same which provides all of the advantages of the prior art, while simultaneously overcoming some of the disadvantages normally associated therewith.

Another object of the present invention is to provide a new and improved cotton reel apparatus and method of using the same that can be readily adapted to existing equipment used in the field.

A further object of the present invention is to provide a new and improved cotton reel apparatus and method of using the same which may be manufactured with but not limited to cotton strippers, cotton pickers, cotton harvesters, and or row attachments to be sold as a single unit.

Still yet another object of this invention is to provide a new and improved cotton reel apparatus and method of using the same that reduces tillage passes and suppress in-row weeds.

It is even a further object of the present invention to provide a new and improved cotton reel apparatus and method of utilizing same which is more environmentally friendly than existing means for weed eradication.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings, illustrations, pictures, and appendices.

DETAILED DESCRIPTION OF THE PREFERRED EMBODIMENTS

Figure 1:
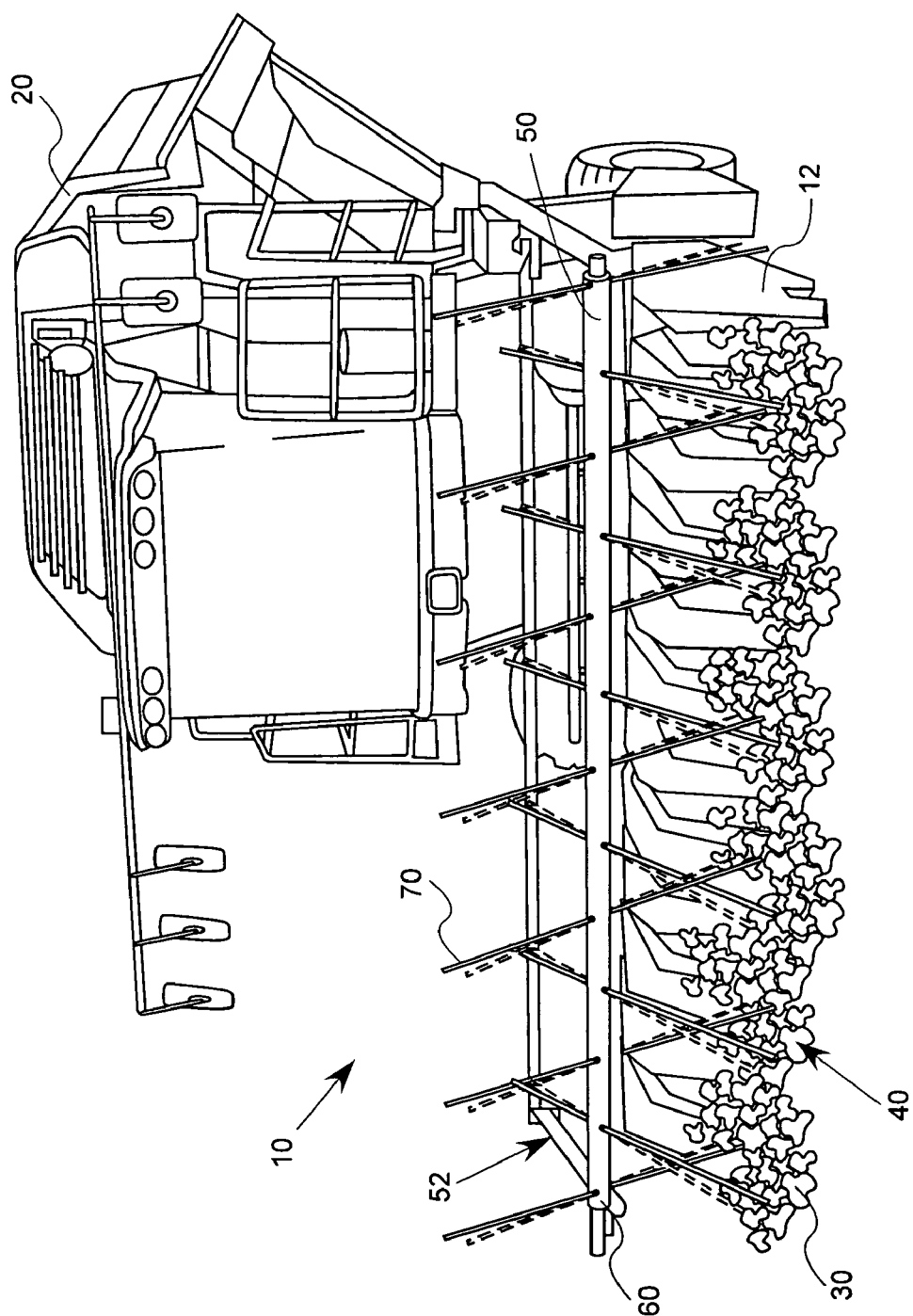
FIG. 1 is a perspective view of a preferred embodiment of the invention generally depicting weed removal from a field.
Figure 2:
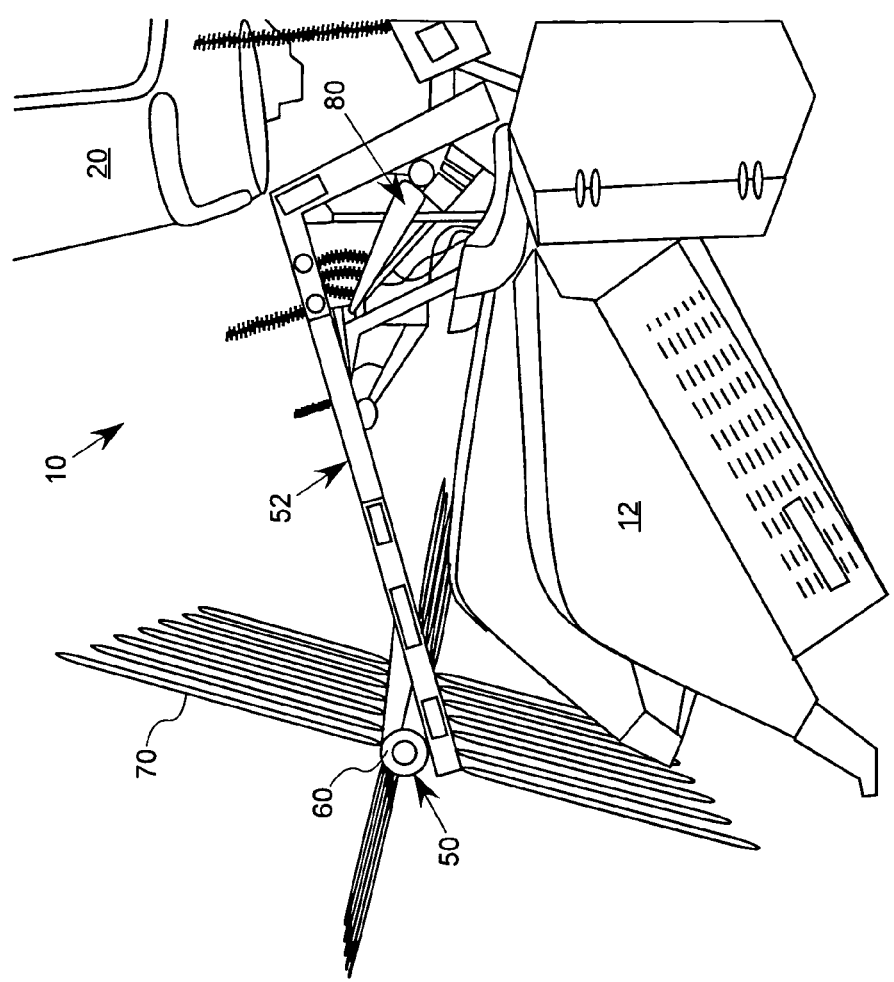
FIG. 2 is a side view of the invention generally depicted in FIG. 1.

Referring to the illustrations, drawings, and pictures, and to FIG. 1 in particular, reference character 10 generally designates a new and improved cotton weed reel and method of using the same (collectively referred to herein as invention 10). It is understood that the invention may be used in other harvesting and/or crop management applications besides specific cotton utilities, thus, the title of the invention should not be considered to limit the scope of the invention. Invention 10 may also be used in various types of crop farming, such as corn, soybean, rice, wheat, canola, vegetable crops, forest tree crops, forage crops, cellulosic ethanol feedstocks and row farming in general. Furthermore, it is contemplated that invention 10 may be retrofitted to existing machines, made in conjunction with new machines, permanently attached, removably attached, and combinations thereof.

Invention 10 may be used in multiple applications where it is desired to contact a surface in a similar fashion. Likewise, invention 10 may be utilized specifically with JOHN DEERE equipment as depicted and specifically but not limited to cotton harvesters with a row unit or header assembly 12. It is understood that other farm equipment could be used not associated with the aforementioned. It is further contemplated that invention 10 may be utilized as a stand-alone unit not in conjunction with a cotton stripper or cotton harvester 20.

In a preferred construction, invention 10 is attached to, or utilized in conjunction with, cotton harvester 20 wherein cotton 30 is processed from field 40 having parallel side by side row channels of cotton plants. Invention 10 may generally comprise a rotating reel 50 disposed in front of cotton harvester 20; however, while not shown, it is understood that invention 10 may be adapted to trail behind cotton harvester 20. Reel 50 generally comprises a frame unit 52 connected to cotton harvester 20, wherein frame unit 52 comprises two parallel frame members 54 and 56 having a front end 54a and 56a and a rear end 54b and 56b, the front end 54a and 56a of the frame members 54 and 56 have rotatably mounted therebetween a shaft 60 rotatable about an axis substantially perpendicular to the direction of travel of cotton harvester 20. It is understood that "substantially perpendicular," as used herein, includes slight angle deviations from the forward direction of travel.

Reel 50 is also shown to include rods 70 extending radially outwardly from shaft 60 that rotate axially with shaft 60. It is contemplated that rods 70 may be positioned along reel 50 such that the impact of rods 70 is not along the rows of planted cotton, but rather the areas between. It is further contemplated that rods 70 may be positioned to contact the cotton plant, partially in contact, and so forth. Reel 50 may be rotated in a clockwise or counterclockwise, forward or reverse, direction as desired.

In a preferred embodiment, rods 70 may be of a flexible nature and comprised of fiberglass, plastic, soft metals or other type material which allows for bending when contacting the ground. It is contemplated that the flexibility may provide a flinging action to more easily uproot unwanted materials while also providing a smoother operation when contacting rocks or other material that is not uprootable. It is also further contemplated that less flexible material may be used, such as more rigid metals, when flexibility may not be desirable. Rods 70 may be replaceable in nature.

Figure 3B:
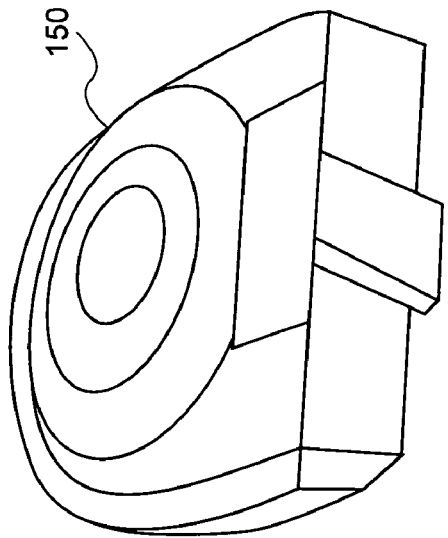
FIG. 3B is an illustration of a preferred embodiment of the foot pedal operable with the invention.

It is further contemplated that reel 50 may be raised or lowered by means of a height control system 80 coupled to the frame unit 52 such that rods 70 may contact the earth at a preferred depth. Such contact while rotating allows for rods 70 to uproot and pitch out undesired vegetations such as weeds commonly found in crop farming. Height control system 80 may utilize hydraulic lift means, such as but not limited to hydraulic action pistons (not shown) for raising and lowering as desired by an operator. Furthermore, it is contemplated that operator may have controls in the cab which may also include automatic features wherein a foot pedal 150 is provided as shown in FIG. 3B. It is also contemplated that operator may control the revolution of reel 50 as desired.

Invention 10 may utilize existing power trains, supply, and so forth from a cotton harvester 20 although it is contemplated that other means may be utilized for independent operations from the vehicle. Power coupling may be of conventional configuration known in the art.

Figure 3A:
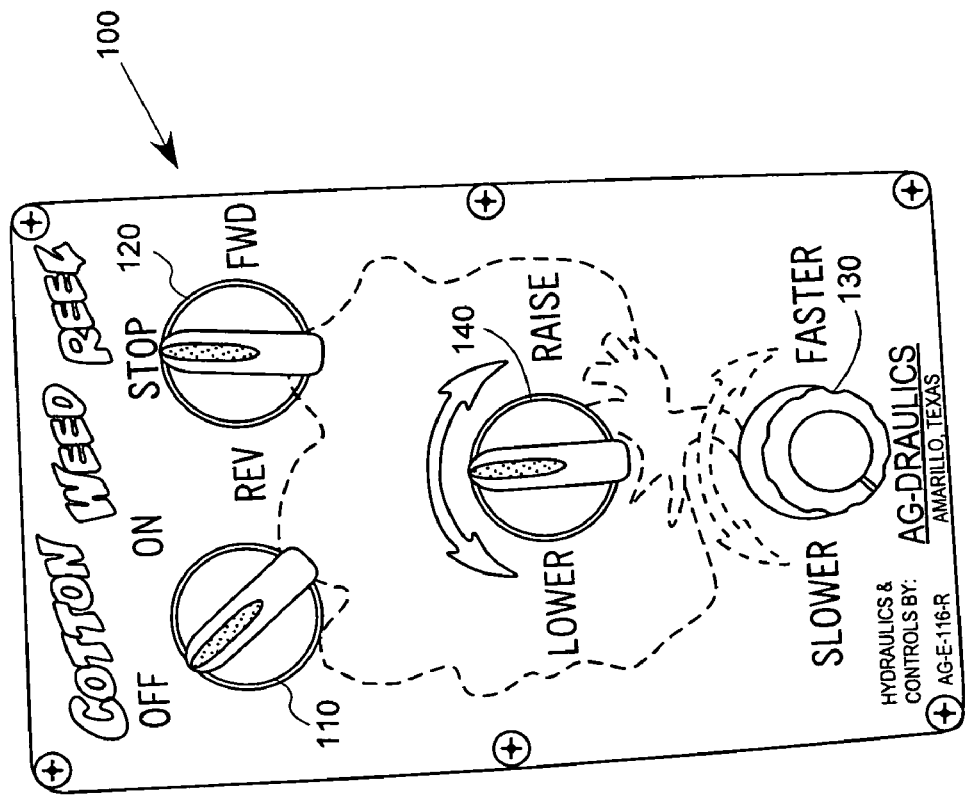
FIG. 3A is an illustration of a preferred embodiment of the control panel operable with the invention.
Figure 4:
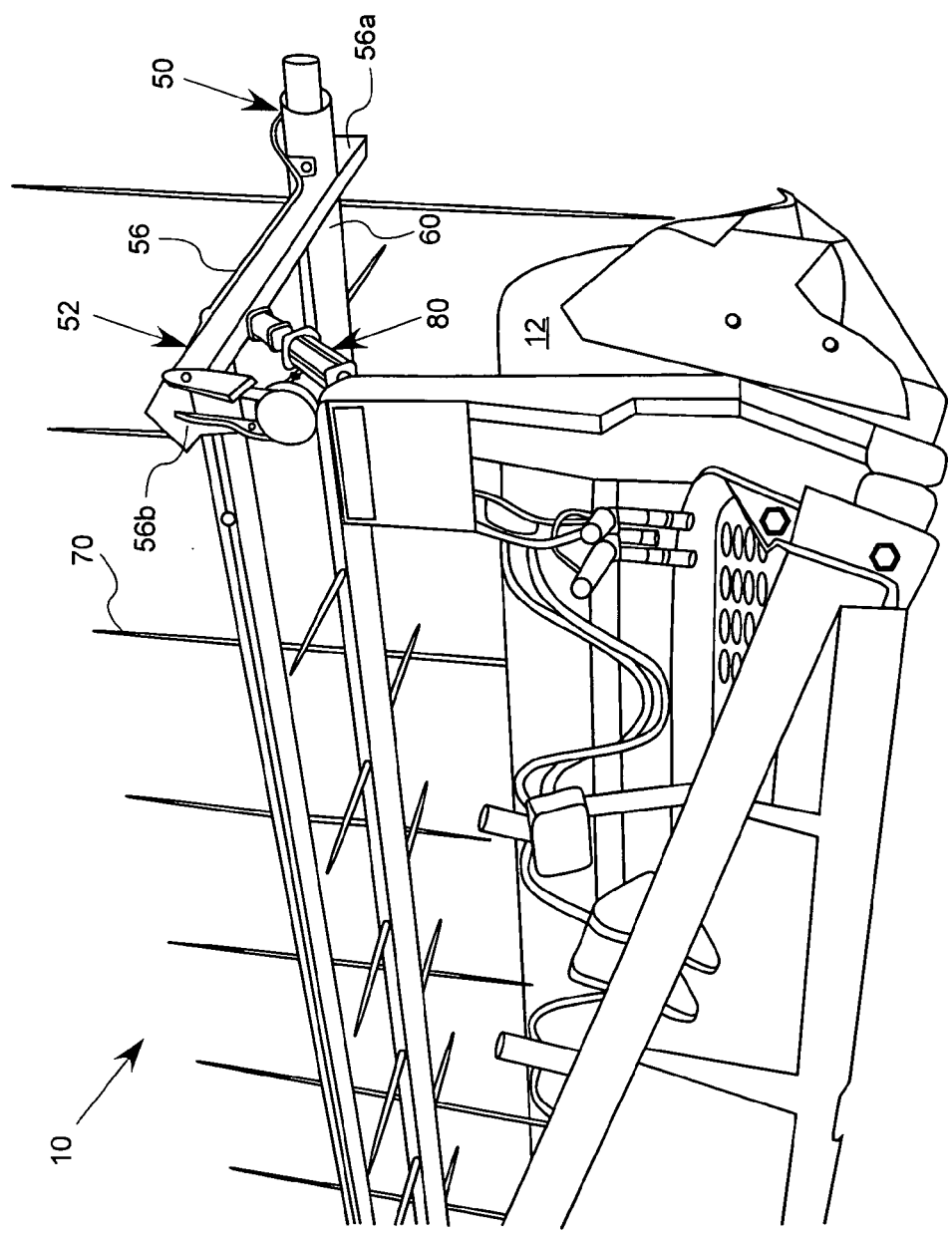
FIG. 4 is a perspective view of a preferred embodiment of the invention generally depicting a raised position.
Figure 5:
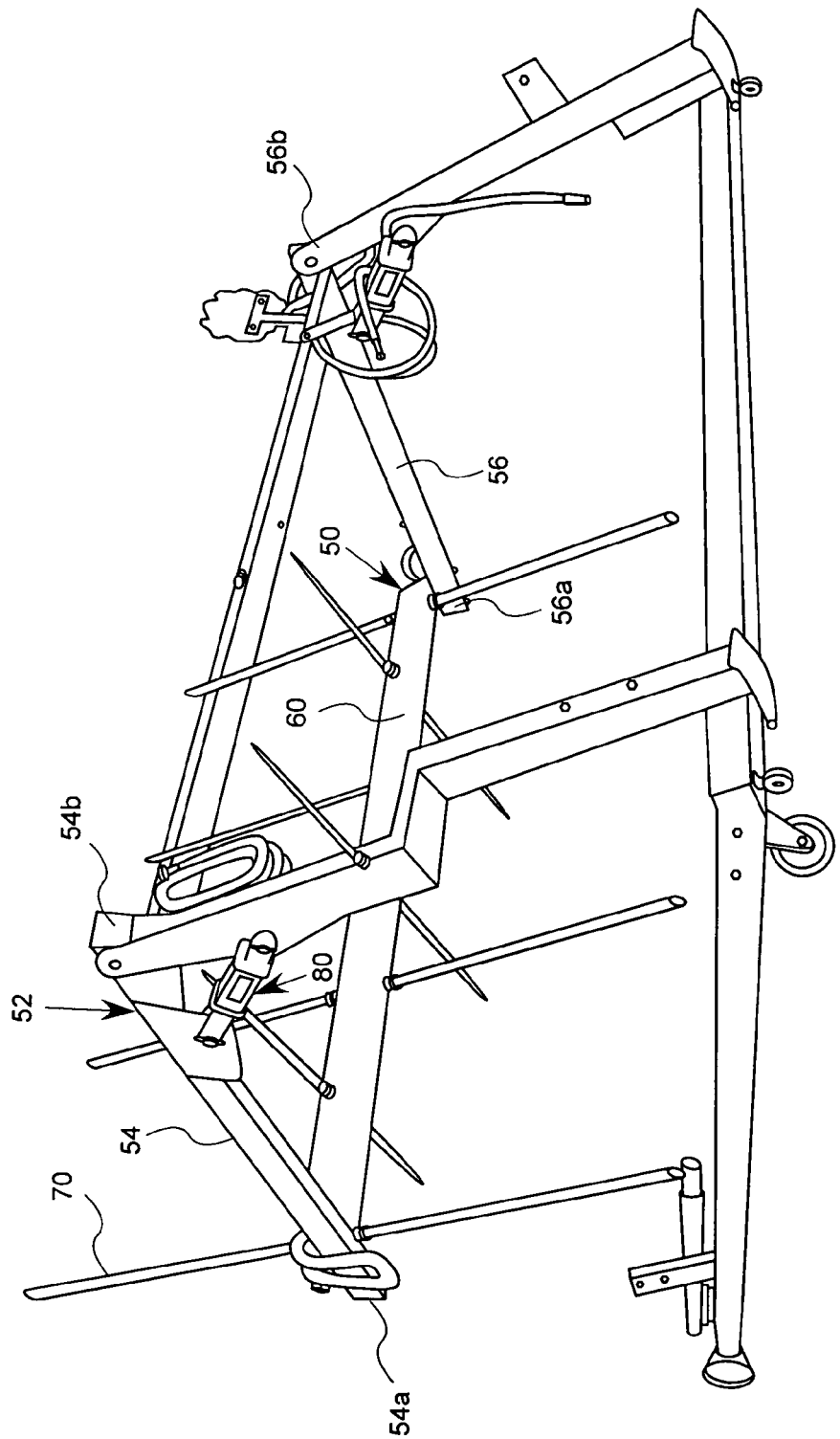
FIG. 5 is a perspective view of a preferred embodiment of the invention.
Figure 6:
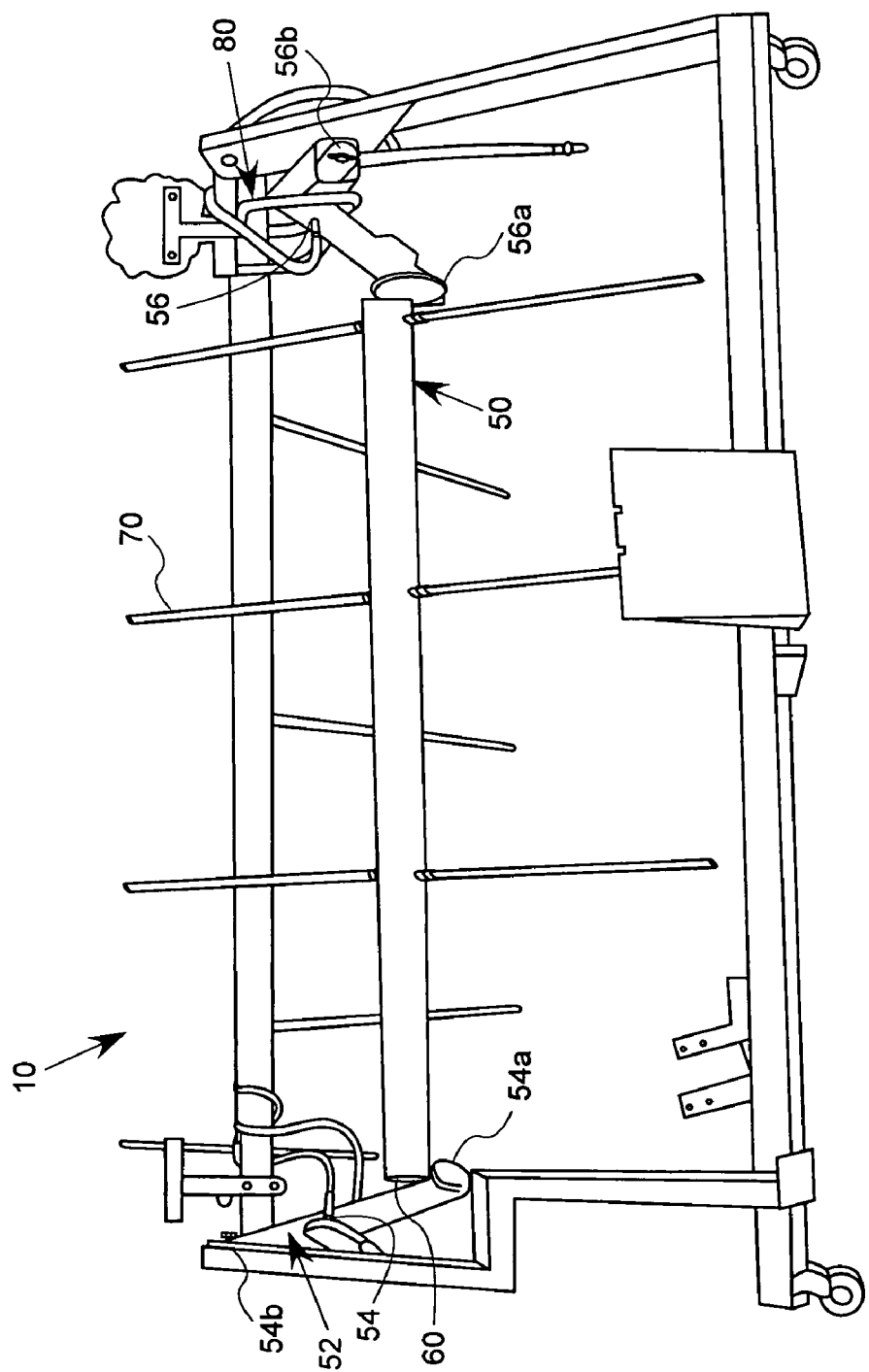
FIG. 6 is a front (or rear view) of a preferred embodiment of the invention generally depicted in FIG. 5.

As further depicted in FIG. 3A, invention 10 may include control panel 100 comprising an "off and on" switch or main power control 110, a "stop, reverse, forward" switch or reel rotation direction control 120, an adjustable "slower/faster" reel speed control or incremental reel rotation speed control 130, an adjustable "lower/raise" reel control or incremental reel height adjustment control 140. It is further contemplated that the foot pedal control 150 may be utilized in conjunction with or separate from control panel 100 wherein operator may depress or otherwise activate foot pedal control 150 which may start reel 50 turning in whichever direction the rotation direction control 120 is selected (forward or reverse). It is contemplated that reel 50 may not run if rotation direction control 120 is in the "stop" position.

It is contemplated that control panel 100 may include an activator for use with foot pedal control 150. In a preferred construction, an "on/off" switch or main power control 110 may include a setting for "pedal" that activates or otherwise engages foot pedal control 150 as desired.

Operation

To raise or lower reel 50, with main power control or switch 110 in the "on" position, turn the "lower/raise" reel 50 height adjustment control 140 until desired height for rods 70 to ground is obtained. It may be desirable to allow rods 70 to barely skim the surface for removal of weeds, deeper for rock removal, higher for assisting in pushing cotton or material into the cotton harvester 20 and so forth.

To run reel 50 continuously, select the desired direction of rotation ("Rev" or "Fwd") with the rotation direction control 120 and place the main power control 110 in the "on" position. Adjust reel 50 speed by turning the "slower/faster" control or rotation speed control 130 until desired speed is obtained. It is contemplated that lower or higher speeds may be desired when the harvester 20 is moving at faster speeds, slower speeds, and so forth.

With main power switch in the "Pedal" position, depressing foot pedal 150 will start reel 50 turning in whichever direction the rotation direction control 120 is positioned (forward or reverse). It is contemplated reel 50 will not run if rotation direction control 120 selector switch is in the "stop" position.

It is contemplated to run reel 50 intermittently. When a desired reel 50 speed is obtained, the main power control 110 can be set to "pedal". Depressing foot pedal 150 will start reel 50 rotation. Reel 50 will continue to run as long as foot pedal 150 is depressed or otherwise activated.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

We claim:

1. Cotton harvesting equipment comprising:
    a cotton harvester including a header assembly attached thereto;
    a weed reel operable with said header assembly for suppressing weed growth between at least two parallel side by side row channels of cotton plants, the row channels of cotton plants being spaced a predetermined distance apart in a transverse direction relative to the forward direction of travel of the cotton harvester, wherein said weed reel comprises:
        a frame unit connected to said cotton harvester, wherein said frame unit comprises two parallel frame members having a front end and a rear end, the front end of the frame members have rotatably mounted therebetween a shaft rotatable about an axis substantially perpendicular to the direction of travel of said cotton harvester;
        a plurality of rods, extending radially outwardly from said shaft, horizontally spaced along said shaft to engage weeds while in the ground between at least two parallel side by side row channels of cotton plants during rotation; and
    a height control system coupled to said frame unit for adjusting the elevation of said weed reel.

2. The cotton harvesting equipment of claim 1, wherein said plurality of rods are removable.

3. The cotton harvesting equipment of claim 1, wherein said plurality of rods are flexible.

4. The cotton harvesting equipment of claim 1, wherein said height control system includes hydraulic lift means for vertically positioning the weed reel.

* * * * *